United States Patent [19]

Caron

[11] 4,307,844
[45] Dec. 29, 1981

[54] MULCHING STAND FOR ROTARY LAWNMOWER

[76] Inventor: Bruno Caron, 164 Benjamin-Sulte St., Boucherville, Canada, J4B 2L7

[21] Appl. No.: 163,879

[22] Filed: Jun. 27, 1980

Related U.S. Application Data

[63] Continuation-in-part of Ser. No. 46,095, Jun. 6, 1979, abandoned.

[51] Int. Cl.³ .................... B02C 18/10; B02C 18/22
[52] U.S. Cl. .................................................. 241/101.1
[58] Field of Search ............... 241/101.1, 101.2, 101.7; 56/16.9, 17.5

[56] References Cited

U.S. PATENT DOCUMENTS 3,526,261  9/1970  Iuey et al. ............... 241/101.1 UX
3,808,782  5/1974  McWilliams ........................ 56/16.9
3,908,914  9/1975  Cushman ......................... 241/101.7
4,150,796  4/1979  Kudo ............................. 241/101.7 X
4,169,561  10/1979  Saxton .............................. 241/101.1

FOREIGN PATENT DOCUMENTS 623020  7/1961  Canada .

Primary Examiner—Howard N. Goldberg

[57] ABSTRACT

A mulching stand for a rotary lawnmower of the type wherein rotary blades are mounted on a vertical shaft inside a housing and coupled to a motor positioned on the housing, is disclosed. The mulching stand comprises a frame for supporting the lawnmower upright a certain distance above the ground, a duct mounted in the structure for guiding material to be mulched upwardly into the path of the rotary blades, a piston device for pushing out of the duct the material remaining therein at the end of the mulching operation.

5 Claims, 6 Drawing Figures

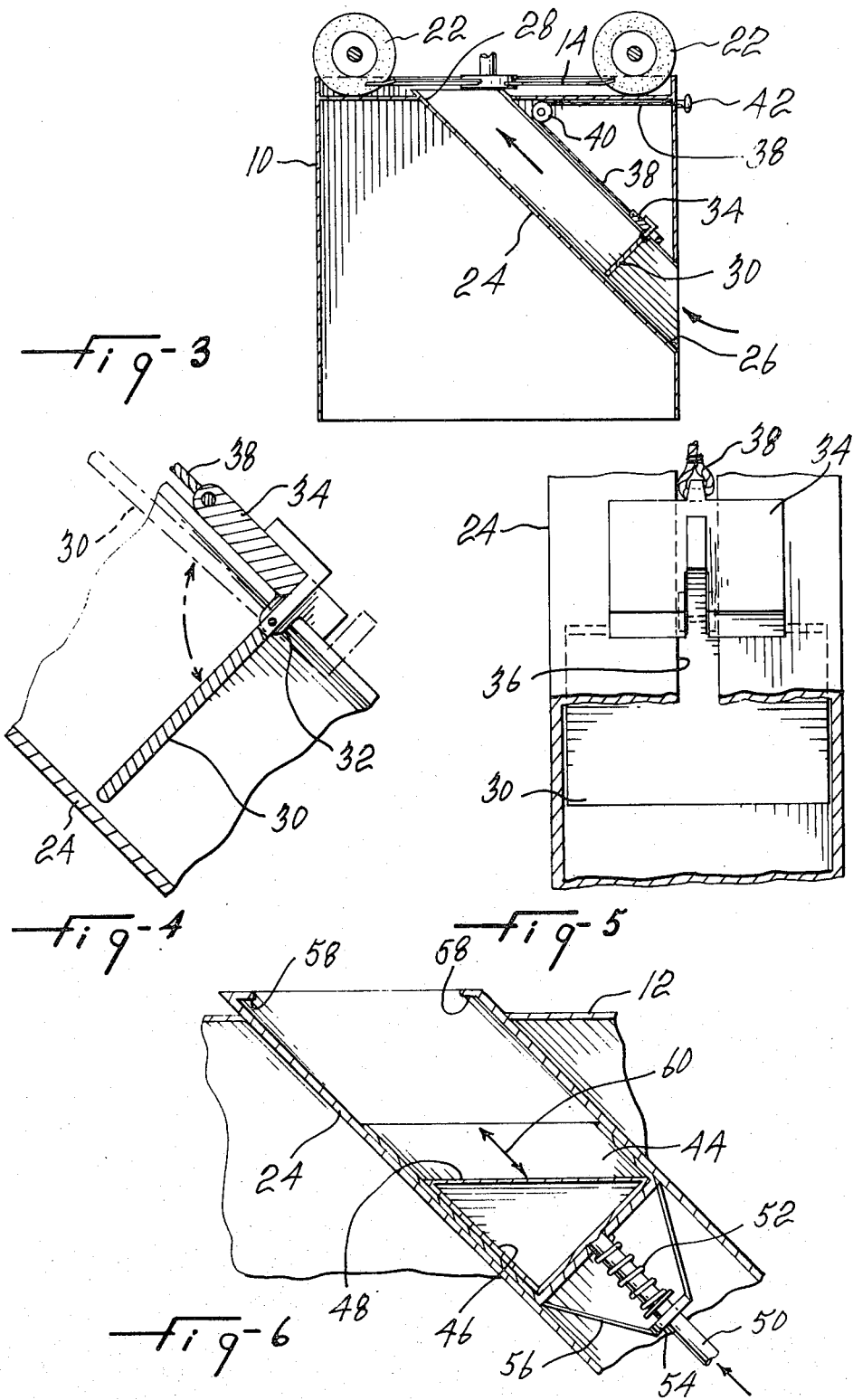

MULCHING STAND FOR ROTARY LAWNMOWER

The present applies is a continuation-in-part of Patent Application Ser. No. 46,095, filed June 6, 1979, now abandoned.

This invention relates to a mulching stand for a rotary lawnmower.

BACKGROUND OF THE INVENTION

It is known to provide a lawnmower with a mulching attachment, which permits various articles, such as small branches, leaves and other organic material, to be fed into the rotary blades of the lawnmower to cut them up so as to make a soil fertilizer. An example of such an attachment is disclosed in Canadian Pat. No. 623,020, issued July 4, 1961. This attachment must, however, be installed on the lawnmower, when needed, and removed therefrom when the mower is used for cutting the grass. This operation is therefore time-consuming.

STATEMENT OF THE INVENTION

It is therefore the object of the present invention to provide a mulching stand for use with a lawnmower, which does not require any special attachment on the lawnmower, therefore saving installation time.

The mulching stand, in accordance with the invention, comprises a frame for supporting the lawnmower upright a certain distance above ground, guiding means mounted on such frame for guiding material to be mulched upwardly into the path of the rotary blades, and piston means for pushing the material out of the guiding means at the end of the mulching operation.

The frame preferably comprises four vertical walls and a top wall joining the vertical walls and upon which the rotary lawnmower may be placed. The means for guiding the material to be mulched preferably is a duct of uniform cross-section mounted at an angle in the frame and having an inlet port in registry with an opening in one of the vertical walls of the frame and an outlet port in registry with an opening in the top wall of the frame.

In one embodiment of the invention, the means for pushing the material out of the duct at the end of the mulching operation comprises a door mounted in the duct, movable to open position by the material when pushed into the duct and closable under gravity. Said door is provided with means for slidably moving the door within the duct when the door is in closed position after insertion of the material to be mulched inside the hopper.

In a second embodiment of the invention, the piston means is a piston assembly removably and slidably mounted within the duct and having an operating rod extending through the inlet port of the hopper.

BRIEF DESCRIPTION OF THE DRAWINGS

The invention will now be disclosed, by way of example, with reference to a preferred embodiment illustrated in the accompanying drawings, in which:

FIG. 3 illustrates a view taken along line 3—3 of FIG. 1;

FIG. 4 illustrates an enlarged partial longitudinal section of the duct showing the door mounted therein;

FIG. 5 illustrates a top view, partially in section, of the means for sliding the door, shown in FIG. 4; and FIG. 6 illustrates a partial longitudinal section of the duct provided with a piston means for pushing the material to be mulched out of the duct at the end of the mulching operation.

DESCRIPTION OF THE TWO PREFERRED EMBODIMENTS OF THE INVENTION

Figure 1:
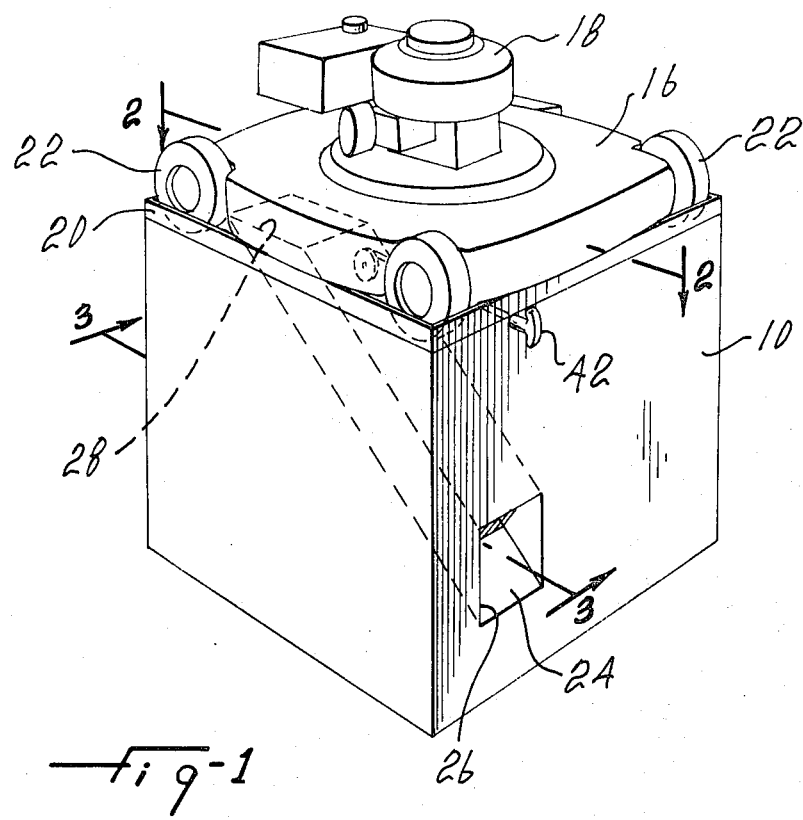
FIG. 1 illustrates a perspective view of a mulching stand in accordance with the invention with a conventional rotary lawnmower in operative position thereon.
Figure 2:
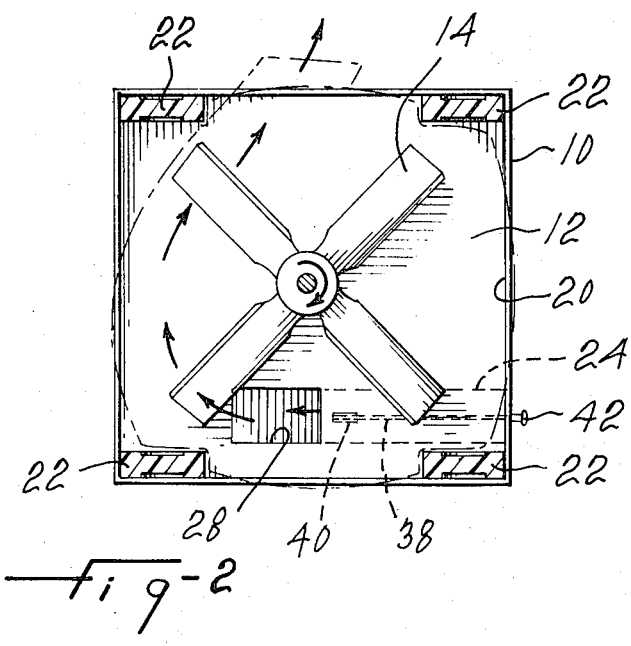
FIG. 2 illustrates a view taken along line 2—2 of FIG. 1.

Referring to FIGS. 1 and 2 of the drawings, there is shown a stand comprising a frame made of four vertical walls 10 and a top wall 12, upon which is placed a regular lawnmower provided with rotary blades 14 located within a housing 16 and powered by a motor 18. The lawnmower may not be secured to the stand and only requires to be mounted upright thereon, so that it will not move on its wheels. In the embodiment shown in the drawings, the side walls 10 extend slightly above the top wall 12, so as to form a lip 20, and the side of the stand is such that the wheels 22 of the lawnmower fit tight in the four corners formed by the lip 20 above the stand.

Referring to FIGS. 3 to 5, a guide means, in the form of a duct 24, of uniform cross-section throughout the length, is mounted in the stand. The inlet port of the duct is in registry with an opening 26 in one of the side walls 10, and the outlet port of the duct is in registry with an opening 28 in the top wall 12.

A door 30 is mounted in the duct. The door is freely hinged on the dependent member 32 of a block 34, which is located on the outside top surface of the duct. The door 30 is movable to the position illustrated in dash line in FIG. 4 of the drawings by the material pushed into the hopper. A slot 36 is provided in the top wall of the duct for allowing sliding movement of the block 34 under the action of a cable 38, which is attached at one end to the block, past around a pulley 40, and attached at its other end to a handle 42 located outside the stand. When the material to be fed into the duct has been pushed past the door 30, the latter will close by gravity. Then, it will be possible, without any danger of injury, to use the door as a means for pushing the material to be mulched into the blades by pulling on the handle 42.

FIG. 6 of the drawings illustrates another means of feeding the material to be mulched into the blades of the mower, which comprises a piston assembly including a first hollow piston 44 slidably mounted on the inside wall of the duct 24, and a second piston 46 slidably mounted within the first piston. The second piston 46 has a front wall 48 which is parallel to top wall 12 and, consequently, to the plane of the rotation of the blades 14 of the mower and is secured to the end of an operating rod 50. A compression spring 52 is provided for biasing the second piston into a retracted position in the bottom of the hollow piston 44. Rod 50 is guided by means of a ring 54 supported by brackets 56 secured to the piston 44. In operation, the material to be mulched is pushed into the blades by operating rod 50 until the piston 44 engages the stop means 58 located at the outlet port of the duct. Then, the second piston moves forward the distance indicated by double arrow 60, so as to feed the material to be mulched as close as possible to the blades. For the latter purpose, duct 24 extends slightly above top wall 12. When the operating rod is withdrawn, the spring 52 retracts the piston 46 into the bottom of hollow piston 44, as shown in FIG. 6. The material to be mulched is thrown out of the lawnmower in the same manner as when the mower is used for cutting grass and may be collected in the regular bag of the mower or in some other bag attached to the lawnmower.

In practice, it is only necessary to operate the piston means of FIGS. 3 to 5, or of FIG. 6, at the end of the mulching operation. During this operation, the door 30 remains adjacent inlet opening 26 or piston assembly 44,46 is completely withdrawn from duct 24. Branches, vegetable stems, leaves and other material to be mulched, once inserted into duct 24, do not slide out because of friction with the duct walls and also, as far as dry leaves are concerned, due to the vacuum exerted by the rotating mower blades 14. At the end of the operation, door 30 is slid upwardly by pulling an handle 42 or the piston assembly 44,46 is inserted into duct 24 and pushed upwardly only to feed to the blades 14, the material remaining in the duct 24. When using door 30, the small amount of material remaining in the top portion of duct 24 can be easily manually extracted after removal of the lawnmower from the stand.

What I claim is:

1. A mulching stand for a rotary lawnmower of the type having a housing and wherein rotary blades are mounted on a vertical shaft inside said housing and coupled to a motor positioned on said housing, said stand comprising a frame for removably supporting the lawnmower upright a certain distance above ground, said frame comprising four vertical sides and a top wall, upon which said rotary lawnmower may be placed, a duct of uniform cross-section throughout its length mounted at an angle within said frame and having an inlet port in registry with an opening in one of the vertical sides of the frame and an outlet port in registry with an opening in the top wall of the frame, said duct serving to guide material to be mulched upwardly into the path of said rotary blade, and piston means movable within said duct for pushing towards said rotary blades, the material remaining in said duct at the end of the mulching operation.

2. A mulching stand as defined in claim 1, wherein said piston means comprises a door mounted in said duct, movable to open position by the material to be mulched when pushed into the duct and movable to closed position under gravity, and means for slidably moving said door within said duct when the door is in closed position.

3. A mulching stand as claimed in claim 2, wherein said duct has a longitudinal slot in the top surface thereof, and said means for slidably moving said door includes a block sliding on the top outside surface of said hopper and having a depending member protruding through said slot, said door being freely and hingedly mounted on said block, a cable attached at one end to said block, a pulley mounted in said frame adjacent said outlet port and on which said cable is trained, and a handle attached to the other end of the cable and protruding outside one of said vertical sides.

4. A mulching stand as defined in claim 1, wherein said piston means is a piston assembly slidably and movably mounted within said duct and having an operating rod extending through the inlet port of the duct, and further comprising means adjacent the outlet port of said duct for stopping the forward movement of said piston assembly.

5. A mulching stand as defined in claim 4, wherein said piston assembly comprises a first hollow piston slidably mounted on the inside walls of the duct, a second piston coupled to said operating rod and slidably mounted on the inside wall of said first piston, and having a front wall parallel to the plane of said top wall, so as to permit feeding of the material to be mulched close to the path of the rotary blades, and a spring mounted on said operating rod for biasing said second piston to a retracted position within said first hollow piston.

* * * * *